United States Patent
Min et al.

(10) Patent No.: US 8,986,462 B2
(45) Date of Patent: Mar. 24, 2015

(54) METHOD FOR CLEANING WATER PURIFIER

(75) Inventors: Deul-Re Min, Geumcheon-Gu (KR); Kwang-Ha Suh, Geumcheon-Gu (KR); Min-Je Cho, Geumcheon-Gu (KR); Young-Jin Kim, Geumcheon-Gu (KR); Byung-Tak Park, Geumcheon-Gu (KR)

(73) Assignee: LG Electronics Inc., Seoul (KR)

( * ) Notice: Subject to any disclaimer, the term of this patent is extended or adjusted under 35 U.S.C. 154(b) by 685 days.

(21) Appl. No.: 13/147,134

(22) PCT Filed: Jun. 23, 2009

(86) PCT No.: PCT/KR2009/003368
§ 371 (c)(1),
(2), (4) Date: Jul. 29, 2011

(87) PCT Pub. No.: WO2010/090377
PCT Pub. Date: Aug. 12, 2010

(65) Prior Publication Data
US 2011/0297187 A1    Dec. 8, 2011

(30) Foreign Application Priority Data
Feb. 4, 2009   (KR) .................. 10-2009-0008746

(51) Int. Cl.
*B08B 9/00*    (2006.01)
*C02F 1/00*    (2006.01)
(Continued)

(52) U.S. Cl.
CPC ............. *C02F 1/001* (2013.01); *C02F 1/004* (2013.01); *C02F 1/008* (2013.01); *C02F 1/283* (2013.01); *C02F 1/44* (2013.01); *C02F 1/441* (2013.01); *C02F 2209/40* (2013.01); *C02F 2209/42* (2013.01); *C02F 2303/16* (2013.01)

USPC ...... 134/22.1; 134/18; 134/22.11; 134/22.12; 134/22.18; 134/26

(58) Field of Classification Search
None
See application file for complete search history.

(56) References Cited

U.S. PATENT DOCUMENTS

| 7,089,763 B2 * | 8/2006 | Forsberg et al. ............ 62/635 |
| 2002/0110482 A1 | 8/2002 | Lawton |

(Continued)

FOREIGN PATENT DOCUMENTS

| JP | 60-193514 | 2/1985 |
| JP | 1114157 A | 1/1999 |

(Continued)

*Primary Examiner* — Eric Golightly
(74) *Attorney, Agent, or Firm* — McKenna Long & Aldridge LLP

(57) ABSTRACT

A method for cleaning a water purifier comprising: a filtering unit; a water tank unit for storing purified water having passed through the filtering unit; and a discharging unit for discharging out the purified water stored in the water tank unit, the method comprises: a cleaning water supplying step of supplying cleaning water in which a cleaning agent is dissolved to the water tank unit; a cleaning water discharging step of discharging the cleaning water when a predetermined time has lapsed; a rinsing water supplying step of supplying rinsing water to the water tank unit when the cleaning water discharging step has been completed; and a rinsing water discharging step of discharging the rinsing water when a predetermined time has lapsed. In the method, cleaning and rinsing processes for a water purifier are automatically executed by a series of consecutive processes. Accordingly, a user can directly clean the water purifier if necessary without requiring a Codi's visit.

14 Claims, 8 Drawing Sheets

(51) Int. Cl.
*C02F 1/28* (2006.01)
*C02F 1/44* (2006.01)

(56) References Cited

U.S. PATENT DOCUMENTS

2004/0040902 A1 3/2004 Hill et al.
2008/0272033 A1 11/2008 Underwood et al.

FOREIGN PATENT DOCUMENTS

| JP | 2000061463 A | 2/2000 |
| JP | 03-635934 | 4/2005 |
| KR | 10-1998-0067469 | 10/1998 |
| KR | 10-2006-0118216 | 11/2006 |
| KR | 10-0843153 | 6/2008 |
| KR | 10-0843154 | 6/2008 |
| WO | WO 01/05484 A1 | 1/2001 |

* cited by examiner

METHOD FOR CLEANING WATER PURIFIER

This application is a National Stage Entry of International Application No. PCT/KR2009/003368, filed Jun. 23, 2009, and claims the benefit of Korean Application No. 10-2009-0008746, filed on Feb. 4, 2009, all of the applications are hereby incorporated by reference for all purposes as if fully set forth herein.

TECHNICAL FIELD

The present invention relates to a water purifier, and particularly, to a method for cleaning a water purifier capable of removing contaminants accumulated on an inner part of the water purifier when the water purifier has been used for a long time.

BACKGROUND ART

Generally, a water purifier serves to filter harmful ingredients such as foreign materials or heavy metals included in water in a physical or chemical manner. A similar apparatus to the water purifier may include an ionized water apparatus, etc.

The water purifier may be directly classified into a direct type one that is directly connected to a faucet, and a storage type one configured to pass water contained in a vessel through a filter.

According to water purifying principles or methods, the water purifier may be divided into a natural filtration type, a direct connection filtration type, an ion exchange resin type, a distillation type, a reverse osmosis type, etc.

The natural filtration method is a method for purifying stored water by passing it through a ceramic filter by gravity, and the direct connection filtration method is a method for directly connecting a water purifier to a faucet. The ion exchange resin method is a method for removing metal dissolved in water from the water in a separation manner, by using an ionized exchange resin filter, and the distillation method is a method for purifying water by cooling vapor generated when boiling the water. And, the reverse osmosis method is a method for filtering impurities by passing water through a semi-permeable membrane with using a pressure.

This water purifier may be largely divided into a filtering unit for filtering contaminants from raw water, a water tank unit for storing purified water having passed through the filtering unit, and a discharging unit for discharging the purified water stored in the water tank unit.

However, in the conventional water purifier, a function of the filtering unit may be degraded according to the usage time or the usage amount. And, inner components of the water purifier, especially, components through which water passes or in which water is stored may have water stains or contaminant stains accumulated thereon. This may result in pollution of a user's drinking water.

To prevent these problems, the water purifier has been cleaned as a special person who cleans components of the water purifier (so-called, 'Codi') periodically visits the water purifier purchaser's home or company, so as to replace the filter by a new one.

However, in the conventional method for cleaning a water purifier by a Codi, a cleaning agent is put into the water tank unit, and then water stored in the water tank unit is discharged after a predetermined time has lapsed.

And, the cleaning agent remaining in the water tank unit is removed by supplying water to the water tank unit and then making the water discharged out by a user under the Codi's instructions.

DISCLOSURE OF INVENTION

Technical Problem

This conventional method for cleaning a water purifier has the following problems.

Firstly, the filtering unit is provided with filter connecting portions for sequentially connecting a plurality of filters thereto. Here, since a cleaning agent is input to the water tank unit, contaminants or water stains, etc. accumulated on the filter connecting portions may not be easily removed.

Secondly, whether a cleaning process using the cleaning agent put into the water tank unit has been completed or not is judged by the Codi's intuition or by lapse of time. In this case, the Codi has to be always concerned about his or her watch. When the judgment is performed based on the Codi's intuition, a difference value may occur in a cleaning degree.

Thirdly, when a user immediately uses the water purifier without following the Codi's instructions after the cleaning agent-included water has been discharged out, the user may drink water mixed with the odor of the cleaning agent. This may result in the user's dissatisfaction about the service or the product.

Technical Solution

Therefore, an object of the present invention is to provide a method for cleaning a water purifier capable of performing a cleaning process using a cleaning agent, and a rinsing process step by step.

Another object of the present invention is to provide a method for cleaning a water purifier capable of excluding a waiting process during a cleaning process and a rinsing process, and capable of solving a user's inconvenience occurring during a cleaning agent inputting process.

To achieve these and other advantages and in accordance with the purpose of the present invention, as embodied and broadly described herein, there is provided a method for cleaning a water purifier comprising: a filtering unit for filtering raw water supplied from a wellhead into purified water; a water tank unit for storing the purified water; and a discharging unit for discharging out the purified water stored in the water tank unit, the method comprising: a cleaning water supplying step of supplying cleaning water in which a cleaning agent is dissolved to the water tank unit; a cleaning water discharging step of discharging the cleaning water when a predetermined time has lapsed; a rinsing water supplying step of supplying rinsing water to the water tank unit when the rinsing water supplying step has been completed; and a rinsing water discharging step of discharging the rinsing water when a predetermined time has lapsed.

In the cleaning water supplying step of the method for cleaning a water purifier, a cleaning agent may be input to the water tank unit, and then the cleaning agent may be dissolved by supplying water into the water tank unit.

In the method for cleaning a water purifier, the cleaning water supplying step may comprise a cleaning agent vessel coupling step of separating one filter from the filtering unit, and coupling, to the filtering unit, a cleaning agent vessel including a cleaning agent stored therein; and a raw water supplying step of supplying raw water to the cleaning agent vessel, and thereby dissolving the cleaning agent by the raw water.

In the method for cleaning a water purifier, the water tank unit may be filled up to the highest level with the cleaning water.

The method for cleaning a water purifier may further comprise a remaining water discharging step of discharging purified water remaining in the water tank unit before the cleaning water supplying step.

The method for cleaning a water purifier may further comprise a filter coupling step of separating the cleaning agent vessel from the filtering unit and then coupling one filter to the filtering unit after the cleaning water discharging step.

In the method for cleaning a water purifier, the filtering unit may include a plurality of coupling portions for coupling a plurality of filters thereto, and filter connecting portions for serially communicating the filters coupled to the coupling portions with each other.

The cleaning agent vessel may be coupled to one of the coupling portions, and bypass caps for communicating the filter connecting portions connected to the respective coupling portions with each other may be coupled to the rest coupling portions.

In the method for cleaning a water purifier, the cleaning agent vessel may be coupled to the coupling portion through which raw water firstly passes.

The method for cleaning a water purifier may further comprise a filter coupling step of separating the cleaning agent vessel from the filtering unit, and coupling filters including a pre-carbon filter and a post-carbon filter to the filtering unit after the cleaning water discharging step.

In the method for cleaning a water purifier, the water tank unit may include a storage tank for storing purified water having passed through the filtering unit, a cold water tank communicated with the storage tank for storing cold water, and a hot water tank communicated with the storage tank for storing hot water.

Each of the storage tank, the cold water tank, and the hot water tank may be filled up to the highest level with the cleaning water, respectively.

In the method for cleaning a water purifier, the cleaning water discharging step may further comprise a cleaning completion informing step of informing completion of a cleaning process when a predetermined time has lapsed, and a drain hose connecting step of connecting a drain hose to the discharging unit.

In the rinsing water supplying step of the method for cleaning a water purifier, the rinsing water filled the water tank unit up to the highest level.

The method for cleaning a water purifier may further comprise a rinsing completion informing step of informing completion of a cleaning process after the rinsing water discharging step has been completed.

In the method for cleaning a water purifier, the rinsing completion informing step may be performed by one of visual and auditory means.

The method for cleaning a water purifier according to the present invention may have the following advantages.

Firstly, cleaning and rinsing processes for a water purifier may be automatically executed by a series of consecutive processes. Accordingly, a user may directly clean the water purifier if necessary without requiring a Codi's visit.

Secondly, the number of times that the Codi visits the use's home for cleaning of the water purifier may be reduced. This may allow the Codi to have an enhanced working efficiency, and to pay less efforts to a cleaning process for the water purifier.

Thirdly, the cleaning process for the water purifier may be executed from time to time according to the user's necessity. This may allow the cleaning agent vessel including a cleaning agent therein to be sold as a single component, resulting in an enhanced profitability of the product company.

The foregoing and other objects, features, aspects and advantages of the present invention will become more apparent from the following detailed description of the present invention when taken in conjunction with the accompanying drawings.

BEST MODE FOR CARRYING OUT THE INVENTION

Description will now be given in detail of the present invention, with reference to the accompanying drawings.

Hereinafter, a method for cleaning a water purifier according to a first embodiment of the present invention will be explained in more detail with reference to the attached drawings. The terms which will be later explained are defined with consideration of the functions of the present invention, which may be differently named according to a user, an operator's intention, or the convention. Therefore, the terms should be defined according to the present invention.

Figure 1:
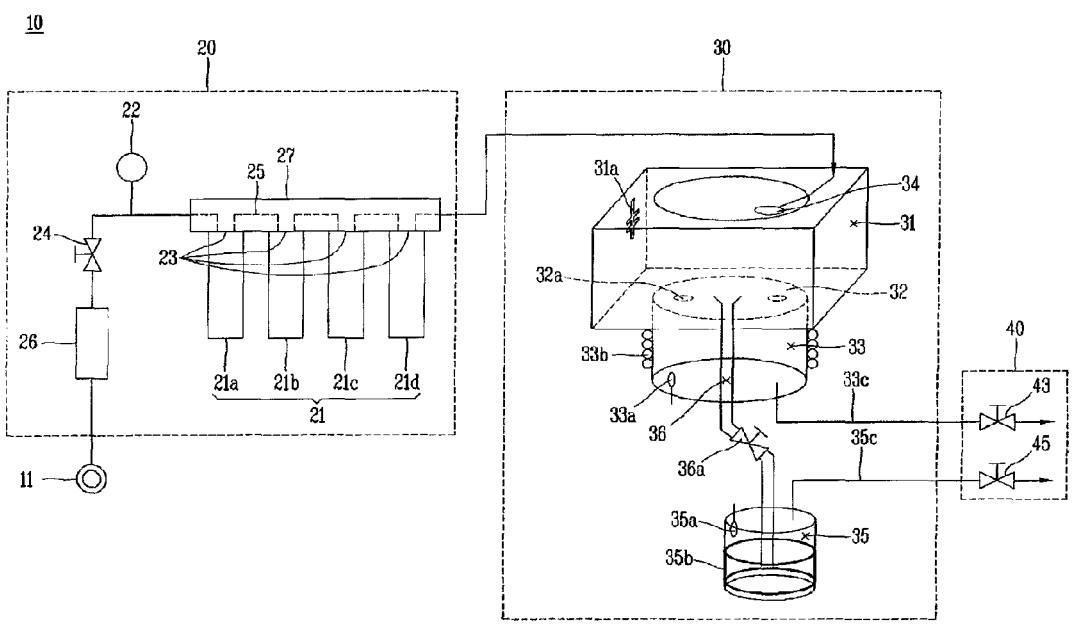
FIG. 1 is a piping diagram schematically showing a water purifier to which a method for cleaning a water purifier according to a first embodiment of the present invention is applied.

FIG. 1 is a piping diagram schematically showing a water purifier to which a method for cleaning a water purifier according to a first embodiment of the present invention is applied.

Referring to FIG. 1, will be explained a water purifier to which a method for cleaning a water purifier according to a first embodiment of the present invention is applied.

As shown in FIG. 1, a water purifier 10 to which a method for cleaning a water purifier according to a first embodiment of the present invention is applied may comprise a filtering unit 20 for filtering raw water into purified water; a water tank unit 30 for storing the purified water therein; and a discharging unit 40 for discharging out the purified water stored in the water tank unit 30.

The filtering unit 20 serves to filter raw water supplied from a wellhead such as a faucet and a storage tank, into purified water. And, the filtering unit 20 may include at least one filter 21 and a filter head 27. At the filter head 27, formed are coupling portions 23 for coupling the filters 21 thereto, and filter connecting portions 25 for communicating the filters 21 coupled to the coupling portions 23 with each other so that purified water having passed through the filters 21 can be supplied to the water tank unit 30.

The filters 21 may consist of a sediment filter 21a, a pre-carbon filter 21b, a reverse osmosis membrane filter 21c, and a post-carbon filter.

The filters 21 may further include an ultra-filtration filter, and a nano-filtration filter.

The sediment filter 21a is provided with a non-woven fabric, thereby filtering foreign materials and floating materials contained in the raw water.

The pre-carbon filter 21b serves to filter chlorine or odor contained in the raw water by applying a surface activated carbon to the raw water.

The reverse osmosis membrane filter 23c serves to filter minute particles having a size of about 0.001 μm.

The post-carbon filter 21d has better absorption than the surface activated carbon of the pre-carbon filter 21b, thereby removing odors and tints.

The ultra-filtration filter is implemented as a thread-shaped membrane having a hollow center, thereby filtering bacteria contained in the raw water.

The filters 21 are detachably coupled to the filter head 27, and connects the filters 21 in serial. And, the filter head 27 serves to connect the wellhead and the water tank unit 30 to each other.

For this, the filter head 27 may include coupling portions 23 to which the filters 21 are coupled, and filter connecting portions 25 implemented in the form of pipes so as to serially connect the coupling portions 23 to each other so that water having passed through one filter 21 can be supplied to the next filter 21.

At the pipe which connects the wellhead 11 and the filtering unit 20, may be further provided a pre-filter 26, a raw water supplying valve 24, and a flow amount detecting unit 22.

The filtering unit 20 serves to filter contaminants in advance, the contaminants supplied to the filtering unit 20 to degrade the efficiency of the filters 21. The raw water supplying valve 24 serves to control supply of raw water to the filtering unit 20. And, the flow amount detecting unit 22 serves to measure a flow amount of the raw water supplied to the filtering unit 20 so as to check the current state of the pre-filter 26 and whether the pre-filter 26 has to be replaced by a new one.

The raw water supplying valve 24 may be implemented as a gate valve, a cock valve, etc. that are manually opened and closed, or as a solenoid valve that is automatically opened and closed.

The water tank unit 30 may be implemented as a storage tank 31 for storing purified water having passed through the filtering unit 20. The storage tank 31 may be provided with a float valve 34 opened and closed by a floating force when a predetermined amount of the purified water is stored in the storage tank 31.

The storage tank 31 may be further provided with a water level sensor 31a for sensing the amount of purified water stored in the storage tank 31.

Besides the storage tank 31, the water tank unit 31 may further include a cold water tank 33 and a hot water tank 35 configured to be communicated with the storage tank 31, respectively.

The cold water tank 33 may be disposed below the storage tank 31 by being integrally formed with the storage tank 31, or so as to be communicated with the storage tank 31 by being coupled to the storage tank 31. The water tank unit 30 may be further provided with a partition plate 32 configured to partition the storage tank 31 and the cold water tank 33 from each other, and having a purified water supplying hole 32a through which purified water stored in the storage tank 31 can be supplied to the cold water tank 33.

The hot water tank 35 may be implemented to be separately formed from the storage tank 31, but to be communicated with the storage tank 31. And, the hot water tank 35 may be configured to receive purified water through a purified water supplying pipe 36 extending from the partition plate 32.

The purified water supplying pipe 36 may be provided with a hot water amount control valve 36a for controlling the amount of purified water to be supplied to the hot water tank 35.

Accordingly, the amount of cold water stored in the cold water tank 33 is controlled by the float valve 34, and the amount of hot water stored in the hot water tank 35 is controlled by the hot water amount control valve 36a.

Here, a heat exchanger 33b (e.g., evaporator, etc.) for cooling purified water stored in the cold water tank 33 may be wound on an outer circumference of the cold water tank 33. And, a heater 35b for heating purified water stored in the hot water tank 35 may be wound on an outer circumference of the hot water tank 35.

For an enhanced heat exchange rate, the heat exchanger 33b and the heater 35b may be disposed inside the cold water tank 33 and the hot water tank 35.

Temperature sensors 33a and 35a for sensing temperatures of cold water and hot water stored in the cold water tank 33 and the hot water tank 35 may be disposed at the cold water tank 33 and the hot water tank 35, respectively.

Under these configurations, each operation of the heat exchanger 33b and the heater 35b may be controlled.

The hot water tank 35 is separately disposed from the storage tank 31 and the cold water tank 33, in order to prevent lowering of a cooling efficiency by the cold water tank 33, or multiplication of contaminants inside purified water stored in the storage tank 31, each due to heat from the heater 35b.

The discharging unit 40 may be provided with opening and closing valves 43 and 45 for opening and closing a cold water pipe 33c and a hot water pipe 35c connected to the cold water tank 33 and the hot water tank 35, respectively.

The opening and closing valve 43 and 45 may be implemented as solenoid valves opened and closed by receiving electric inputs, as well as cock valves and mechanical valves.

Hereinafter, will be explained a method for cleaning a water purifier according to the first embodiment of the present invention.

Figure 2:
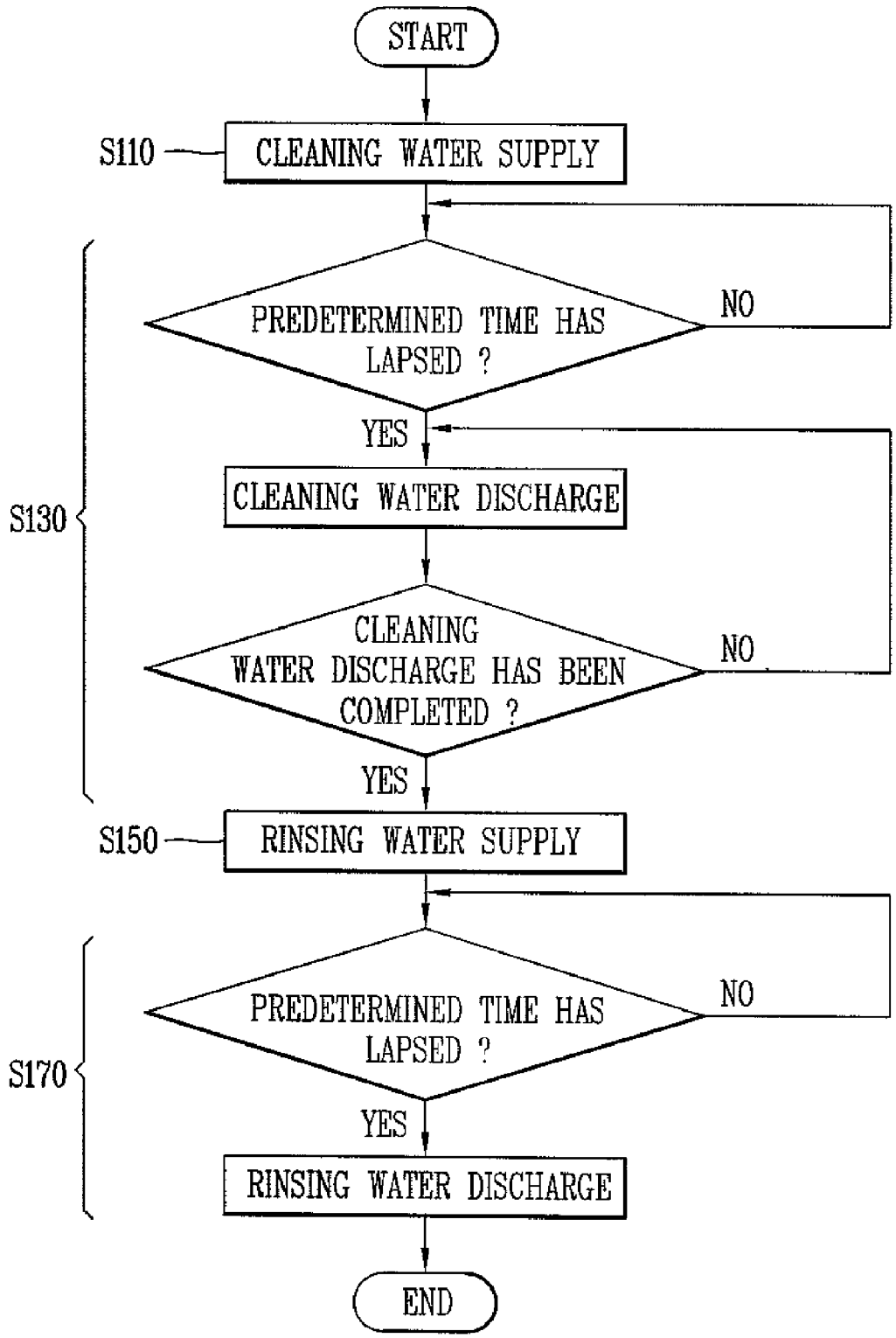
FIG. 2 is a flowchart showing a method for cleaning a water purifier according to a first embodiment of the present invention.
Figure 3:
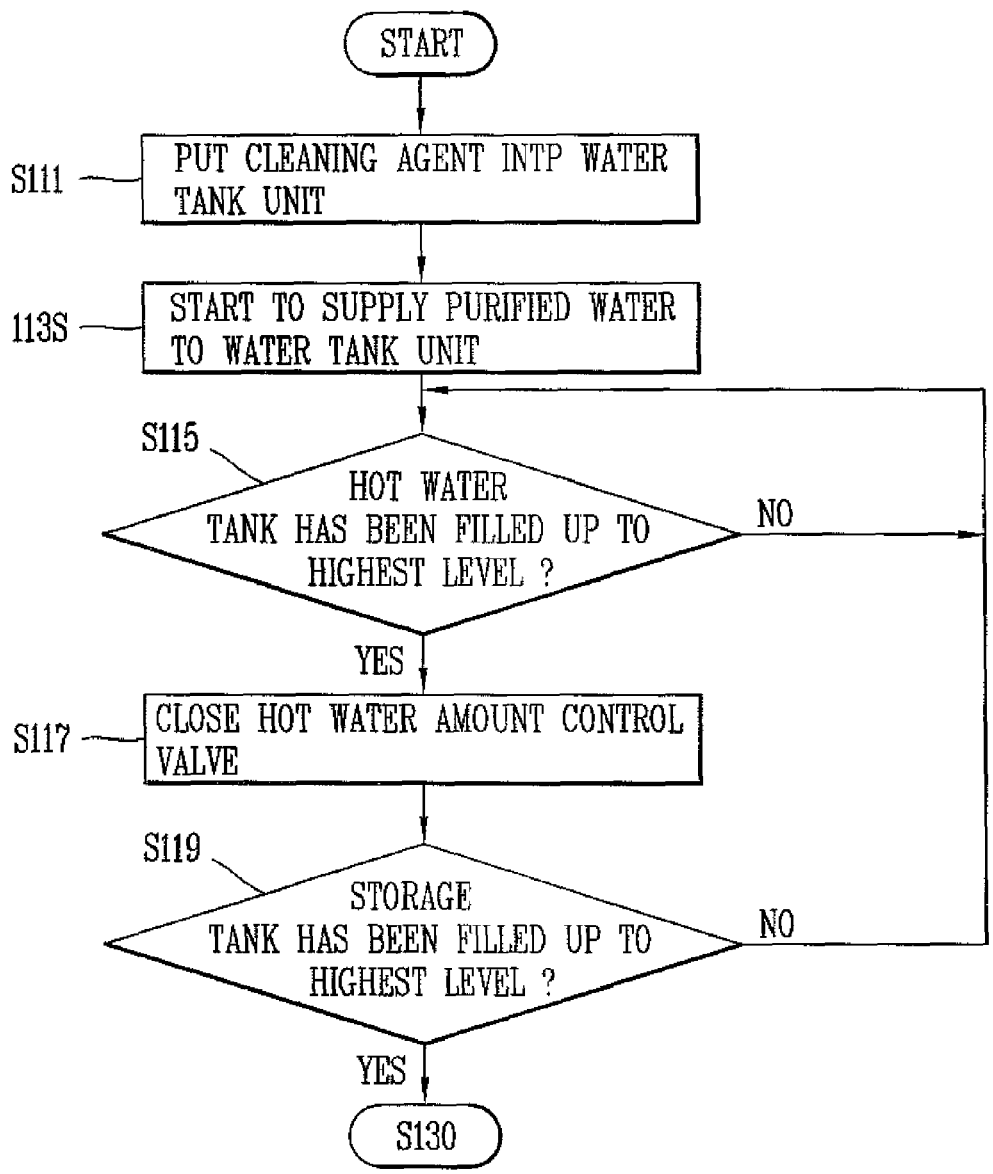
FIG. 3 is a flowchart showing a cleaning water supplying step in FIG. 2.
Figure 4:
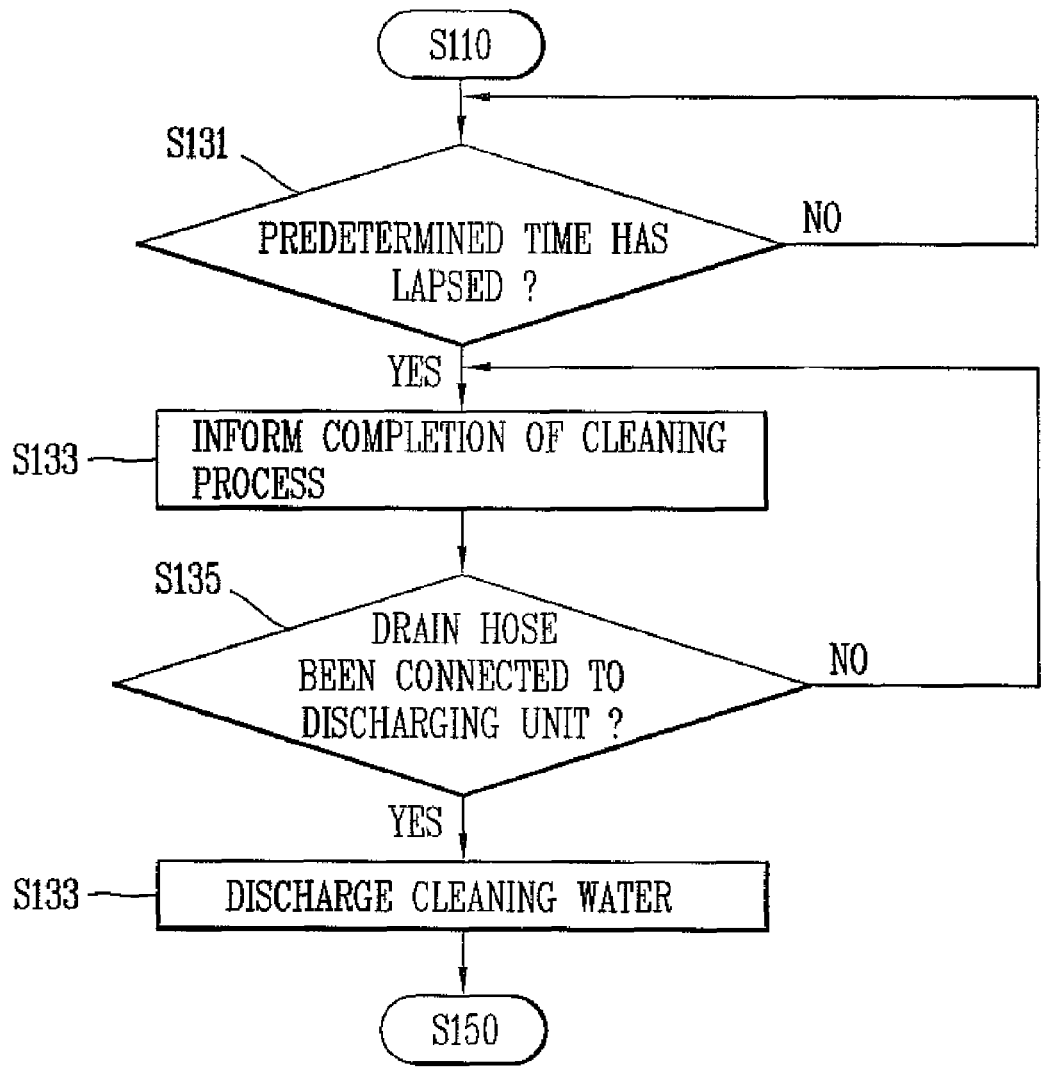
FIG. 4 is a flowchart showing a cleaning water discharging step in FIG. 2.
Figure 5:
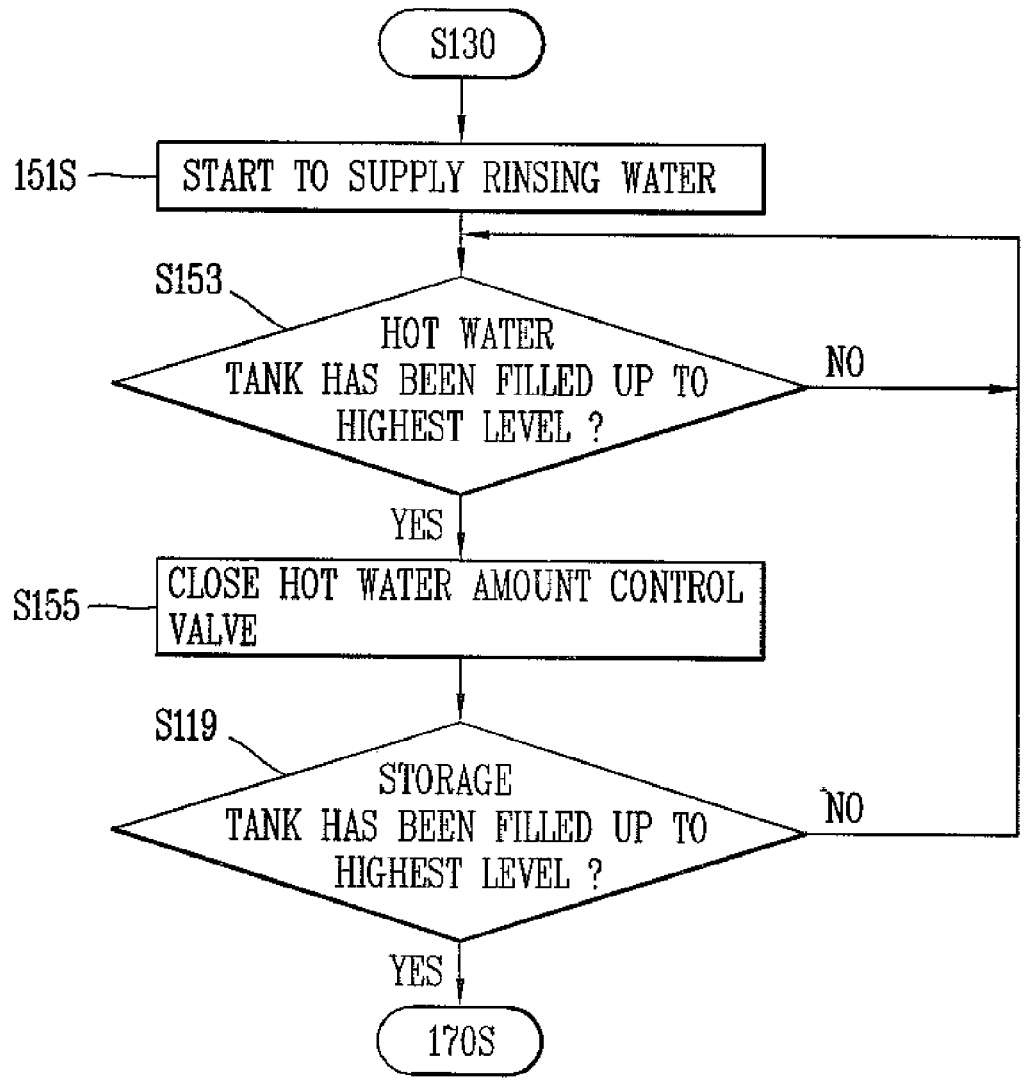
FIG. 5 is a flowchart showing a rinsing water supplying step in FIG. 2.
Figure 6:
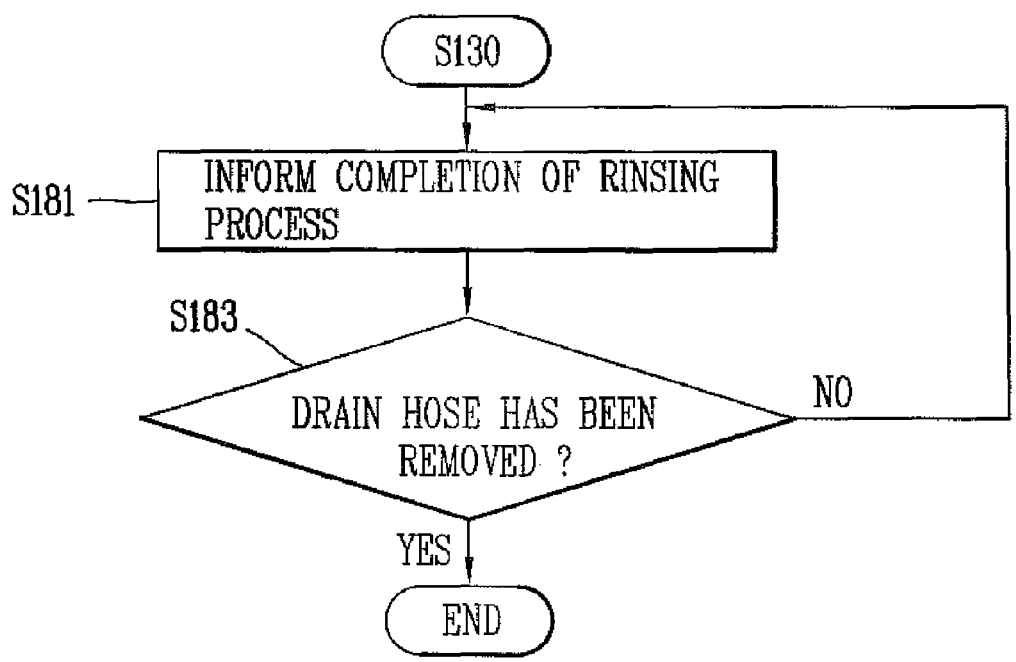
FIG. 6 is a flowchart showing a rinsing completion informing step in FIG. 2.

FIG. 2 is a flowchart showing a method for cleaning a water purifier according to a first embodiment of the present invention, FIG. 3 is a flowchart showing a cleaning water supplying step in FIG. 2, FIG. 4 is a flowchart showing a cleaning water discharging step in FIG. 2, FIG. 5 is a flowchart showing a rinsing water supplying step in FIG. 2, and FIG. 6 is a flowchart showing a rinsing completion informing step in FIG. 2.

Referring to FIGS. 2 to 5, the method for cleaning a water purifier according to a first embodiment of the present invention comprises a cleaning water supplying step (S110), a cleaning water discharging step (S130), a rinsing water supplying step (S150), and a rinsing water discharging step (S170), sequentially.

In the cleaning water supplying step (S110), cleaning water in which a cleaning agent has been dissolved is supplied to the water tank unit 30.

Here, the cleaning water may be obtained by inputting a cleaning agent in the water tank unit 30, then by supplying purified water having passed through the filtering unit 20 to the water tank unit 30, thereby dissolving the cleaning agent.

Preferably, each of the storage tank 31, the cold water tank 33, and the hot water tank 35 of the water tank unit 30 is filled up to the highest level with the cleaning water.

For this, under a state that the hot water amount control valve 36a of the purified water supplying pipe 36 which communicates the storage tank 31 and the hot water tank 35 with each other is opened, it is detected by the water level sensor 31a, etc. whether the hot water tank 35 is filled up to the highest level with water. Once it is detected that the hot water tank 35 has been filled up to the highest level, the hot water amount control valve 36a is closed. Then, it is detected whether the storage tank 31 has been filled up to the highest level with water. Once it is detected that the storage tank 31 has been filled up to the highest level, the supply of the raw water is stopped.

Then, once the cleaning water supply step has been completed, the cleaning water discharging step (S130) is started after a predetermined time lapses.

Here, the predetermined time indicates the time taken to clean the water tank unit 30 by cleaning water, and may be varied according to the shape of the water tank unit 30, the size of the water purifier, and the concentration of the cleaning water. This predetermined time may be determined by those skilled in the art of the present invention.

The cleaning water discharging step (S130) may further include a cleaning completion informing step (S133) for informing completion of a cleaning process to the outside after detecting lapse of a predetermined time.

This may solve the conventional inconvenience to manually check whether a predetermined time has lapsed or not.

The present invention may further comprise a drain hose coupling step (S135) for coupling, to the discharging unit 40, a drain hose (not shown) which connects the discharging unit 40 to a drain hole such as a home sink.

The cleaning water may be prevented from being discharged to an undesired side by repeatedly informing completion of a cleaning process after periodically detecting whether the drain hose has been connected to the discharging unit 40.

Once the cleaning water has been completely discharged out, the rinsing water supplying step (S150) for supplying rinsing water to the water tank unit 30 is started.

Whether the cleaning water has been completely discharged out may be judged based on a discharge time calculated by detecting the amount of the cleaning water supplied to the water tank unit 30 and a discharge speed. Alternatively, whether the cleaning water has been completely discharged out may be judged based on water levels of the storage tank 31, the cold water tank 33, and the hot water tank 35, each sensed by a water level sensor provided therein.

The rinsing water supplying step is very similar to the cleaning water supplying step (S110) except that the cleaning agent has been removed, and thus its detailed explanations will be omitted.

Preferably, like in the cleaning water supplying step, the rinsing water supplying step (S150) is executed by filling purified water up to the highest level of the water tank unit 30.

Once a predetermined time lapses after the rinsing water supplying step has been completed, the rinsing water is discharged out, and the cleaning process for the water purifier is completed.

Whether the rinsing water has been completely discharged out is judged in the almost same manner as the judgment whether the cleaning water has been completely discharged out, and its detailed explanations will be omitted.

Referring to FIG. 6, the present invention may further comprise a rinsing completion informing step (S181) after the rinsing water discharging step (S170) has been completed.

The rinsing completion information step (S181) includes a step of informing completion of a rinsing process to the outside after it is judged that rinsing water has been completely discharged out.

Here, completion of a rinsing process may be informed to the outside in a visual or auditory manner.

In the visual manner, lighting means such as a light emitting diode (LED) may be lighted ON or OFF, or display means such as a liquid crystal display (LCD) may be used.

In the auditory manner, a sound such as a beeper sound may be generated to inform completion of a rinsing process to the outside. Preferably, various types of sounds are implemented so that a user can select according to his or her preference.

It is also preferable to expand types of a sound source so that the user can select his or her desired one by directly inputting various files such as mp3, wave, dcf, and cda from the outside.

After the rinsing completion informing step, performed is a step of judging whether the drain hose has been removed (S183). If the drain hose has not removed yet, the rinsing completion informing step (S181) is periodically repeated. On the contrary, once the drain hose has been removed, the cleaning process is completely finished.

Hereinafter, a method for cleaning a water purifier according to a second embodiment of the present invention will be explained with reference to FIGS. 7 and 8.

Explanations for the same configuration as that of the first embodiment and its detailed description will be omitted.

Figure 7:
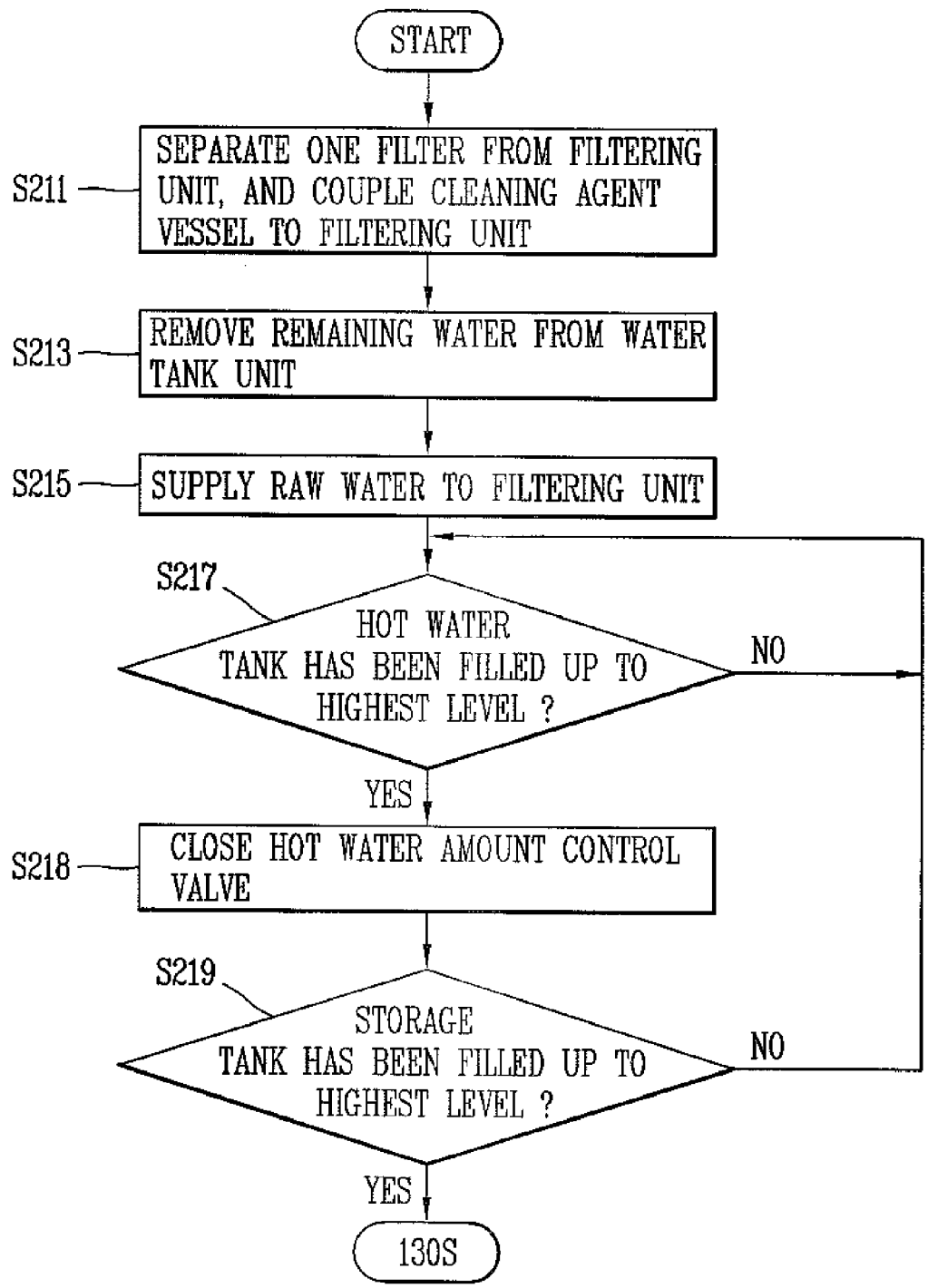
FIG. 7 is a flowchart showing a cleaning water supplying step in a method for cleaning a water purifier according to a second embodiment of the present invention.
Figure 8:
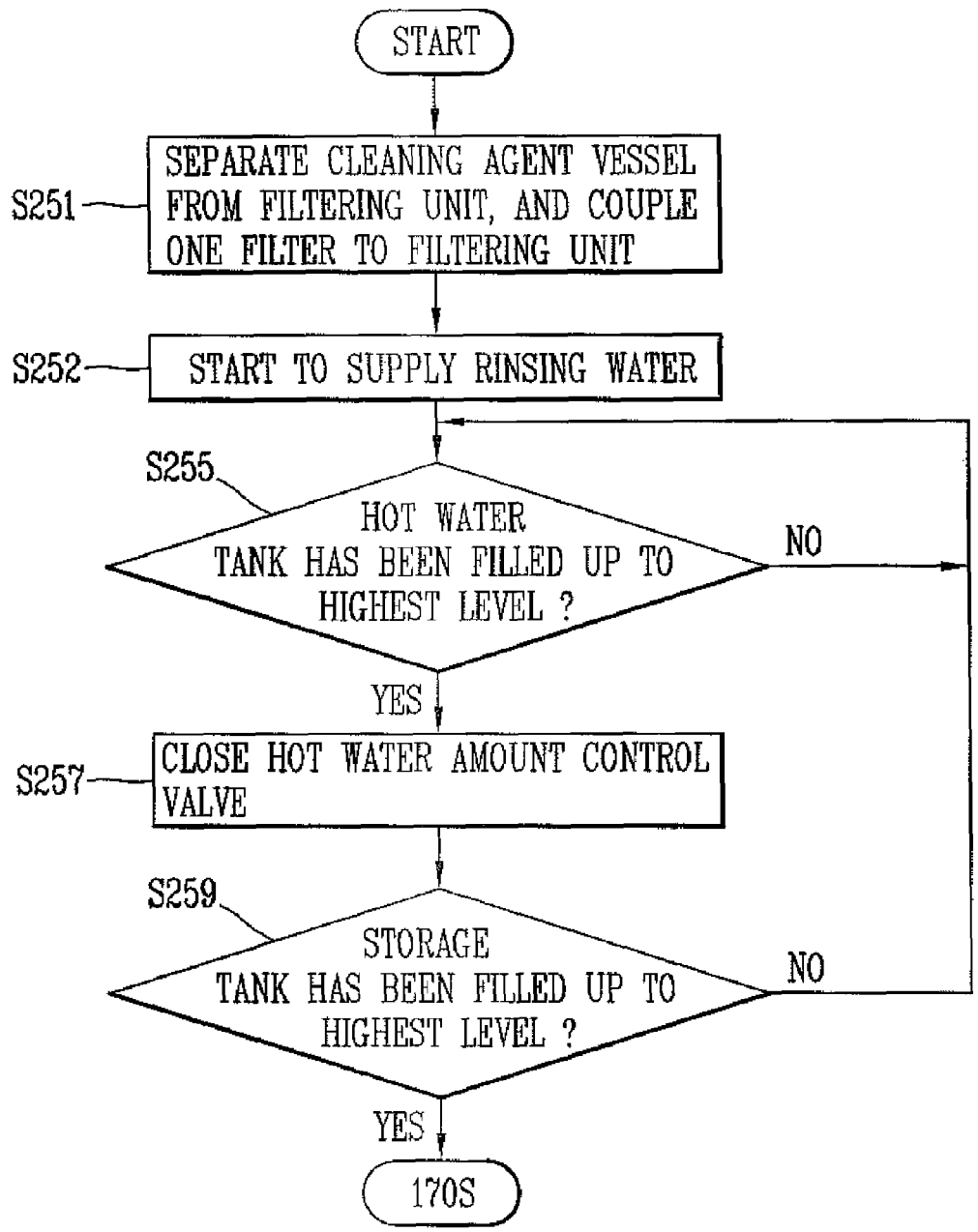
FIG. 8 is a flowchart showing a rinsing water supplying step in the method for cleaning a water purifier according to the second embodiment of the present invention.

FIG. 7 is a flowchart showing a cleaning water supplying step in a method for cleaning a water purifier according to a second embodiment of the present invention, and FIG. 8 is a flowchart showing a rinsing water supplying step in the method for cleaning a water purifier according to the second embodiment of the present invention.

The method for cleaning a water purifier according to the second embodiment is similar to the method according to the first embodiment, in that a cleaning water supplying step (S210), a cleaning water discharging step (S230), a rinsing water supplying step (S250), and a rinsing water discharging step (S270) are sequentially comprised. However, the method according to the second embodiment is different from the method according to the first embodiment in a cleaning water supplying step and in a rinsing water supplying step.

Referring to FIG. 7, in the cleaning water supplying step, a cleaning agent vessel including a cleaning agent stored therein, rather than the filters 21, is coupled to the filtering unit 20. Then, raw water is supplied to the water tank unit 30 so as to be used as cleaning water.

For this, the cleaning water supplying step (S210) may include a cleaning agent vessel coupling step (S211) for separating the filters 21 from the filtering unit 20, and then coupling a cleaning agent vessel including a cleaning agent stored therein, to the filtering unit 20; and a cleaning agent dissolving step (S215) for supplying the raw water to the cleaning agent vessel, and thereby dissolving the cleaning agent by the raw water.

The cleaning water supplying step (S210) may further include a remaining water discharging step (S213) for discharging out purified water remaining in the water tank unit 30 before supplying the raw water to the cleaning agent vessel. This may prevent lowering of a concentration of the cleaning water due to the purified water remaining in the water tank unit 30.

Each of the storage tank 31, the cold water tank 33, and the hot water tank 35 of the water tank unit 30 is filled up to the highest level with the raw water, respectively. Once it is detected that each of the storage tank 31, the cold water tank 33, and the hot water tank 35 of the water tank unit 30 has been filled up to the highest level with the raw water, the supply of the raw water is stopped.

The cleaning agent vessel is coupled to one of the coupling portions 23, and the rest coupling portions 23 are coupled to bypass caps which communicate the filter connecting portions 25 connected to the rest coupling portions with each other.

Preferably, among the coupling portions 23, the cleaning agent vessel is coupled to the coupling portion 23 through which the raw water firstly passes.

In the present invention, cleaning water having passed through the cleaning agent vessel coupled to the coupling portion 23 through which the raw water firstly passes through the rest filter connecting portions 25, thereby cleaning the inside of the rest filter connecting portions 25. This may enhance a cleaning efficiency. And, the cleaning agent vessel may be sold as a single component such as a toner cartridge of a laser printer. In this case, a user may easily clean the water purifier without requiring a Codi's visit.

Recently, the number of single-family homes is increased, resulting in a difficulty in making an appointment between the Codi and the user for a visit time to clean the water purifier. And, the cost due to the Codi's visit, and the cleaning cost are included in the entire sale cost of the water purifier. When considering these recent trends, the user's direct cleaning of the water purifier with using the cleaning agent vessel may enhance the user's satisfaction degree for the product.

Referring to FIG. 8, the rinsing water supplying step (S250) includes a filter coupling step (S251) for separating the cleaning agent vessel from the filtering unit and coupling the filter to the filtering unit after the cleaning water discharging step (S130) has been completed.

Accordingly, the cleaning water remaining in the cleaning agent vessel is prevented from being re-supplied to the water tank unit 30. Furthermore, since a rinsing process is performed by using water purified by the filters 21, a rinsing efficiency may be enhanced.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for cleaning a water purifier comprising:
   a filtering unit;
   a water tank unit for storing purified water having passed through the filtering unit; and
   a discharging unit for discharging out the purified water stored in the water tank unit, the method comprising:
      a cleaning agent vessel coupling step of separating one filter from the filtering unit, and coupling a cleaning agent vessel having a cleaning agent stored therein to the filtering unit;
      a cleaning water supplying step of supplying cleaning water in which the cleaning agent is dissolved to the water tank unit;
      a cleaning water discharging step of discharging out the cleaning water supplied to the water tank unit when a predetermined time has lapsed;
      a rinsing water supplying step of supplying rinsing water to the water tank unit when the cleaning water discharging step has been completed; and
      a rinsing water discharging step of discharging the rinsing water when a predetermined time has lapsed,
      wherein in the cleaning water supplying step, the cleaning agent is input to the water tank unit via the filtering unit, and the cleaning agent in the cleaning agent vessel is dissolved by water.

2. The method of claim 1, wherein the water tank unit is with the cleaning water.

3. The method of claim 2, further comprising a remaining water discharging step of discharging out the water remaining in the water tank unit before the cleaning water supplying step.

4. The method of claim 2, further comprising a filter coupling step of separating the cleaning agent vessel from the filtering unit, and then coupling a filter to the filtering unit after the cleaning water discharging step.

5. The method of claim 2, wherein the filtering unit comprises:
   a plurality of coupling portions for coupling a plurality of filters thereto; and
   filter connecting portions for serially communicating the filters coupled to the coupling portions with each other.

6. The method of claim 5, wherein the cleaning agent vessel is coupled to one of the coupling portions, and bypass caps for communicating the filter connecting portions with each other are coupled to the rest of the coupling portions.

7. The method of claim 6, wherein the cleaning agent vessel is coupled to a coupling portion disposed in an uppermost stream of the filtering unit.

8. The method of claim 6, further comprising a filter coupling step of separating the cleaning agent vessel from a coupling portion, and then coupling a filter to the coupling portion after the cleaning water discharging step.

9. The method of claim 1, wherein the water tank unit comprises:
   a storage tank for storing purified water having passed through the filtering unit;
   a cold water tank communicated with the storage tank for storing cold water; and
   a hot water tank communicated with the storage tank for storing hot water.

10. The method of claim 9, wherein in the cleaning water supplying step, each of the storage tank, the cold water tank, and the hot water tank is filled up with the cleaning water, respectively.

11. The method of claim 1, wherein the cleaning water discharging step further comprises:
- a cleaning completion informing step of informing completion of a cleaning process when a predetermined time has lapsed; and
- a drain hose connecting step of connecting a drain hose to the discharging unit.

12. The method of claim 1, wherein in the rinsing water supplying step, the water tank unit is filled up with the rinsing water.

13. The method of claim 1, further comprising a rinsing completion informing step of informing completion of a cleaning process after the rinsing water discharging step has been completed.

14. The method of claim 13, wherein the rinsing completion informing step is performed by one of visual and auditory means.

* * * * *